(12) United States Patent
Kajander

(10) Patent No.: US 7,435,694 B2
(45) Date of Patent: Oct. 14, 2008

(54) NONWOVEN FIBROUS MATS WITH GOOD HIDING PROPERTIES AND LAMINATE

(75) Inventor: Richard Emil Kajander, Toledo, OH (US)

(73) Assignee: Johns Manville, Denver, CO (US)

( * ) Notice: Subject to any disclaimer, the term of this patent is extended or adjusted under 35 U.S.C. 154(b) by 102 days.

(21) Appl. No.: 10/401,802

(22) Filed: Mar. 28, 2003

(65) Prior Publication Data

US 2004/0192148 A1    Sep. 30, 2004

(51) Int. Cl.
*D04H 1/00* (2006.01)
*B32B 5/16* (2006.01)
*B32B 17/00* (2006.01)
*B32B 17/06* (2006.01)
*B32B 27/00* (2006.01)

(52) U.S. Cl. .................. 442/417; 442/327; 428/426; 428/292.1; 428/297.4; 428/297.7; 428/299.4; 428/299.7

(58) Field of Classification Search .................. 442/59, 442/327, 417; 428/426, 292.1, 297.4, 297.7, 428/299.4, 299.7
See application file for complete search history.

(56) References Cited

U.S. PATENT DOCUMENTS

| 3,348,994 | A | * | 10/1967 | Rees et al. .................. 428/221 |
| 3,676,288 | A |   | 7/1972  | Hoyle |
| 4,818,583 | A |   | 4/1989  | Geel |
| 4,879,163 | A | * | 11/1989 | Woiceshyn .................. 428/198 |
| 5,001,005 | A | * | 3/1991  | Blanpied .................... 442/373 |
| 5,772,846 | A | * | 6/1998  | Jaffee ........................ 162/145 |
| 5,965,257 | A | * | 10/1999 | Ahluwalia .................. 428/357 |
| 6,187,697 | B1 | * | 2/2001 | Jaffee et al. ................ 442/149 |
| 6,432,482 | B1 | * | 8/2002 | Jaffee et al. .............. 427/385.5 |
| 6,497,787 | B1 |   | 12/2002 | Geel |
| 2003/0228460 | A1 | * | 12/2003 | Ahluwalia ............... 428/315.5 |

FOREIGN PATENT DOCUMENTS

WO    WO 01/11140    *    2/2001

* cited by examiner

*Primary Examiner*—Arti Singh
*Assistant Examiner*—Matthew D Matzek
(74) *Attorney, Agent, or Firm*—Robert D. Touslee

(57) ABSTRACT

A fibrous nonwoven mat particularly suited for hiding the color of a substrate when the mat is bonded to the substrate is made by forming a web of fibers from a wet fibrous slurry, saturating the mat with a resinous binder containing 1-20 weight percent of a paper coating material, removing excess binder from the mat to produce a mat having a resin binder content of 5-25 weight percent and drying the mat. The mat has high hiding power for substrates like board or blanket of fiber glass insulation and other colored materials.

7 Claims, No Drawings

NONWOVEN FIBROUS MATS WITH GOOD HIDING PROPERTIES AND LAMINATE

The present invention involves nonwoven mats having particular use in bonding to various substrates and for hiding the substrate, such as the color of the substrate, when viewing from the mat side, and the method of making such mats. The mats produced according to this invention are also useful as reinforcement and dimensional stabilizers for making a large number of products such as insulation composites or laminates of all types and for many uses. The mats are also useful as stabilizing and reinforcing substrates for other products such as duct board, wallboard, etc.

BACKGROUND

It is known to make reinforcing nonwoven mats from fibers and to use these mats as substrates in the manufacture of a large number of products. Methods of making nonwoven mats are known, such as conventional wet laid processes described in U.S. Pat. Nos. 4,112,174; 4,681,802 and 4,810,576, the disclosures of which are hereby incorporated herein by reference. In these processes a slurry of glass fiber is made by adding fiber to a typical white water in a pulper to disperse the fiber in the white water forming a slurry having a fiber concentration of about 0.2-1.0 weight %, metering the slurry into a flow of white water to dilute the fiber concentration to 0.1 or below, and depositing this mixture on to a moving screen forming wire to dewater and form a wet nonwoven fibrous mat.

This wet nonwoven web of fiber is then transferred to a second moving screen in-line with the forming screen and run through a binder application saturating station where an aqueous binder mixture, such as an aqueous urea formaldehyde (UF) resin based binder mixture, is applied to the mat in any one of several known ways. The mat, binder saturated, is then run over a suction section while still on the moving screen to remove excess binder. The wet mat is then transferred to a wire mesh moving belt and run through an oven to dry the wet mat and to cure (polymerize) the UF based resin binder which bonds the fibers together in the mat. Preferably, the aqueous binder solution is applied using a curtain coater or a dip and squeeze applicator, but other methods of application such as spraying are also known.

In the drying and curing oven the mat is subjected to temperatures up to 450 or 500 degrees F. or higher for periods usually not exceeding 1-2 minutes and as little as a few seconds. Alternative forming methods for nonwoven fiber mats include the use of well known processes of cylinder forming, continuous strand mat forming which lays continuous strands of glass fibers in overlapping swirls, and "dry laying" using carding or random fiber distribution.

UF resins, usually modified with one or more of acrylic, styrene butadiene, or vinyl acetate resins, are most commonly used as a binder for glass fiber mats because of their suitability for the applications and their relatively low cost. Melamine formaldehyde resins are sometimes used for higher temperature and/or chemical resistant applications. To improve the toughness of the mats, a combination of higher mat tear strength and mat flexibility, which is needed to permit higher processing speeds on product manufacturing lines and for maximum product performance on the roofs and in other applications, it is common to modify or plasticize the UF resins as described above. The binder content of these finished mats typically are in the range of 15 to 25 weight percent or higher, based on the dry weight of the mat. It is also known to use other types of aqueous latex binders like acrylics, polyester, polyvinyl acetate, polyvinyl alcohol and other types of resinous binders alone or in combination.

Nonwoven fibrous mats are sometimes used as facers for glass fiber insulation blanket and for pressed glass fiber insulation boards and duct liner, the glass fibers in the insulation being bonded together with a binder, typically phenolic resin, that when cured has a yellow, orange, pink, or tan color. Often it is desirable that the mat facer hide the yellow, or other color of the cured insulation substrate, presenting a white surface, but normal glass fiber mat does not cover up the color to the desired extent due to the light transmission of the 10-16 glass fibers normally used in the mat. It is possible to increase the hiding power by adding small diameter glass microfibers, having average diameters of about 2 microns or less, to the mat but this adds considerable cost to the mat, makes the mat weaker and fuzzier and increases the amount of scrap when making this mat due to wrinkling problems.

It is also known, as illustrated by U.S. Pat. No. 5,965,257 to make a mat having zero bleed through when used as a facer mat in the manufacture of foam insulation by heavily coating a dry, bonded mat on a separate coating line. This patent teaches a coating composition comprising one or more fillers and a binder like acrylic latex. It is also known to use off-line coating to make mats having good hiding properties, but off line coating is expensive, often producing a mat that is not cost competitive with alternative facers like Kraft fiber papers and plastic films. Although glass fiber, and sometimes polymer fiber, nonwoven mats are superior in other aspects such as durability, thermal and humidity stability, they often loose out to the lower cost alternatives.

It is also disclosed in U.S. Pat. Nos. 5,001,005 and 5,965,257 to make glass fiber mats containing 60-90 weight percent glass fibers 10-40 percent of non-glass filler material and 1-30 percent of a non-asphaltic binder to use as a facer for a foam substrate. The filler materials are bonded to the glass fibers with the binder and prevent bleed through of the foam precursor materials when the latter is placed in contact with the mat prior to blowing.

SUMMARY OF THE INVENTION

It has been discovered that the addition of certain types of additives, paper coating materials, to the binder used to bond the glass fibers together in the nonwoven mat will produce nonwoven facers having excellent hiding power without adding additional processing costs to the mat, without detracting from the strength properties and without adding manufacturing complications that were inherent in the prior methods of making glass fiber nonwoven mats having good hiding power.

Nonwoven mats of the present invention comprise glass or polymer fibers bonded together with an aqueous binder system containing a conventional resin binder, preferably a water soluble binder like modified urea formaldehyde, melamine formaldehyde, furan, polyvinyl alcohol, hydroxyl ethyl cellulose, carboxyl methyl cellulose, cellulose gums, polyvinyl pyrilidone, polyvinyl acetate homopolymer, etc., and an a paper coating material like a clay, powdered limestone, polymer, glass, and ceramic microspheres, and other conventional white paint pigments, such as titania. The preferred opacifiers are ROPAQUE®, hard acrylic/styrene copolymer microspheres available from Rohm and Haas of Philadelphia, Pa., NovaCote PC™ clay based coatings available from the Georgia-Pacific Corporation of Atlanta, Ga., and titania pigments available from many sources such as SUPER SEATONE® Titanium White supplied by BF Goodrich of Cincinnati, Ohio Mats of the present invention contain 1-20 weight percent, preferably about 3-15 wt. percent, most preferably 5-10 wt. percent, based on the dry weight of the mat resin binder, of the paper coating material.

The preferred fiber is glass fiber, preferably K or H diameter fiber, but other fibers including synthetic fibers like nylon, polyester, polyethylene, etc. can be present in amounts up to 100 percent of the fibers. A small amount of the fibers can be bleached cellulosic fibers or fibers derived from a cellulosic material.

The mats of the present invention are less costly to manufacture than prior mats of the same hiding power because they contain less costly larger diameter fibers than was necessary in prior mats to obtain the same hiding characteristics. These mats are particularly suited for use in the manufacture of thermal and/or sound insulation composites, tack board, a component of office module construction, wallboard, and other like products.

The present invention also includes laminates comprising a layer of insulation glass fibers bonded together with a binder having a color other than white, usually yellow or tan, and having bonded to at least one face a nonwoven fiber glass mat in accordance with the above described inventive mat.

The present invention also includes a process of making the inventive nonwoven fiber mats described above from a slurry of fiber, preferably glass fiber, comprising forming a nonwoven web on a moving, permeable surface and thereafter saturating the fibrous web with an aqueous resin based binder, preferably water soluble such as urea formaldehyde or polyvinyl alcohol binder with or without modification, containing 1-20 weight percent, preferably 5-10 wt. percent, based on the dry weight of the mat resin binder, of one or more additives of a clay, powdered limestone, glass or ceramic microspheres, other conventional white pigments, removing excess aqueous binder and drying and curing the mat in an oven. The resultant mat is normally wound into rolls and packaged for shipment, and/or transported to a point of use.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE INVENTION

Mats of the present invention contain about 93-99.5, preferably about 96-99.5, weight percent fibers and about 0.5-7, preferably 0.75 or 1-4, weight percent binder, exclusive of any additives like pigments, etc. as described below. The majority of the fibers are preferably glass fibers, but other fibers can be present. The glass fibers used to make mats can have various fiber diameters and lengths dependent on the strength and other properties desired in the mat as is well known. It is preferred that the majority of the glass fibers have diameters in the range of less than 6 up to 23 microns or higher, with the major portion of the fiber being preferably in the range of about 10 to 19 microns and most preferably in the range of about 13 to 17 microns, such as 15-17 microns.

The glass fibers can be E glass, C glass, T glass, S glass or any known glass fiber of good strength and durability in the presence of moisture. Normally the glass fibers used all have about the same target length, such as 0.25, 0.5, 0.75, 1 or 1.25 inch, but fibers of different lengths and different average diameters can also be used to get different characteristics in a known manner. Fibers up to about 3 inches in length can be used in a wet process for making glass fiber mats and even longer fibers can be used in some dry processes. Generally the longer the fiber, the higher the tensile and tear strengths of the mat, but the poorer the fiber dispersion.

The binders used to bond the fibers together are preferably resins that can be put into aqueous solution or emulsion latex. Typical resin based binders meeting this description are polyvinyl alcohol, carboxyl methyl cellulose, hydroxyl ethyl cellulose, lignosulfonates, urea formaldehyde resins modified in known manner to plasticize the binder and to provide higher wet strengths, cellulose gums and other similar resins. Of these, conventional modified urea formaldehyde resins are much preferred because of their cost, bonding strength to fibers, particularly glass fibers, and acceptability for various applications.

Paper coating materials have long been used to improve the surface of the paper and more recently to improve its printing characteristics. Paper is made up of fibers closely laid together in a wet process such that the pores between the fibers are very small so that when a paper coating material is applied to the formed paper, the particles in the coating material stay on top of the paper. Nonwoven fiber glass mats though have much larger pores between the fibers as evidenced by the high air permeability in the mats compared to paper and as evidenced by the manner in which an aqueous binder is applied to the newly formed wet web of glass fiber, i.e. by flowing a substantial excess of binder through the mat in a very short time, within a few feet while the mat is moving at several hundred feet per minute, and then removing excess binder from the mat by running the mat over a suction slot. If the permeability of the wet web is not substantially higher than that of paper, the binder will tend to puddle on the surface and not flow the mat. It is for this reason that glass fiber mat is not "coated" wet in the manner used for papers.

The preferred opacifiers are ROPAQUE®, hard acrylic/styrene copolymer microspheres available from Rohm and Haas of Philadelphia, Pa., NovaCote PC™ clay based coatings available from the Georgia-Pacific Corporation of Atlanta, Ga., and titania pigments available from many sources such as SUPER SEATONE® Titanium White supplied by BF Goodrich of Cincinnati, Ohio.

Processes for making nonwoven fiberglass mats are well known and some of them are described in U.S. Pat. Nos. 4,112,174, 4,681,802 and 4,810,576, which references are hereby incorporated into this disclosure by reference, but any known method of making nonwoven mats can be used. The preferred technique for the making of mats of the present invention is forming a dilute aqueous slurry of fibers and depositing the slurry onto an inclined moving screen forming wire to dewater the slurry and form a wet nonwoven fibrous mat, on machines like a Hydroformer™ manufactured by Voith-Sulzer of Appleton, Wis., or a Deltaformer™ manufactured by Valmet/Sandy Hill of Glenns Falls, N.Y. The examples disclosed herein were made on a pilot scale model of a wet forming machine, binder applicator, and oven that produces a mat very similar to a mat that would be produced from the same slurry and binder on a production sized Voith-Sulzer Deltaformer™ with a curtain coater binder applicator and a flat bed, permeable conveyor type convection dryer.

After forming a web from the fibrous slurry, the wet, unbonded fibrous nonwoven web or mat is then transferred to a second moving screen running through a binder application saturating station where the binder, preferably resin based, in aqueous solution is applied to the mat. The excess binder is removed, and the wet mat is transferred to a moving permeable belt that runs through a convection oven where the unbonded, wet mat is dried and cured, to bond the fibers together in the mat. In production, the dry, cured mat is then usually wound into rolls and packaged such as by stretch or shrink wrapping or by putting into a plastic bag to keep out moisture and dirt, etc.

Preferably, the aqueous binder solution is applied using a curtain coater or a dip and squeeze applicator. In the drying and curing oven the mat is heated to temperatures of about 350 degrees F., but this can vary from about 250 degrees F. to as high as will not embrittle or deteriorate the binder, depending upon the type of resin binder used, for periods usually not exceeding 1 or 2 minutes and frequently less than 40 seconds, preferably significantly less than 30 seconds.

EXAMPLE 1

A fiber slurry was prepared in a well known manner by adding one half inch long wet E type glass chopped fiber having fiber diameters averaging about 10 microns to a known cationic white water containing Natrosol™ thickening agent available from Hercules, Inc. and a cationic surfactant C-61, an ethoxylated tallow amine available from Cytec Industries, Inc. of Morristown, N.J., as a dispersing agent to form a slurry having a conventional fiber concentration. After allowing the slurry to agitate for about 20 minutes to thoroughly disperse the fibers, the slurry was metered into a moving stream of the same whitewater to dilute the fiber concentration to conventional concentration weight percent before pumping the diluted slurry to a headbox of a pilot sized machine similar to a Voith Hydroformer™ where a wet nonwoven mat was continuously formed.

The wet mat was removed from the forming wire and transferred to a Sandy Hill Curtain Coater where a conventional aqueous modified urea formaldehyde binder was applied in an amount to provide a binder level in the cured mat of about 25 weight percent. The binder used in this mat did not contain any of the filler agents. The wet mat was then transferred to an oven belt and carried through an oven to dry the mat and to fully cure the binder resin to a temperature of about 300 degrees F.

This is a conventional and control mat. The basis weight of the mat produced was 1.41 lbs./100 sq. ft. and the permeability of the mat was 704 cu. Ft/sq. ft./min., and the thickness was 27 mils. This mat was tested using a Hunter Colorimeter after bonding the mat in a conventional manner to a conventional, yellow, fiberglass wool insulation board. B* is a measure of(L*a*b*) provided by the Hunter Colorimeter. The lower the B* value, the better the mat hides the yellow color of the insulation. The B* value of the yellow, fiberglass insulation alone was about 78. The B* value of this control mat of Example 1 laminated to the yellow, fiberglass insulation was 27.6.

EXAMPLE 2

Another mat was made in the same manner as used in Example 1 except that an addition of 5 wt. percent, based on the dry weight of the binder, of 0.5 micron diameter, hard, hollow, polymer microsphere latex was made to the binder. These microspheres are available from Rohm & Haas of Philadelphia, Pa., as their ROPAQUE® OP96 product. These microspheres are a hard, non-film forming acrylic/styrene copolymer latex that contains a fully encapsulated, water filled core. The water in the core diffuses out of the microspheres during the mat drying process leaving hollow microspheres in the mat. The OP96 product is a milky-white liquid having a solids content of 40 wt. percent, a density of 8.6 lbs./gallon, and a viscosity of less than 300 centipoise. It is a known opacifier for use in a paper coating.

The basis wt. of this mat was 1.42 lbs./100 sq. ft., the permeability was 696 cu. ft./sq. ft./min. and the thickness was 28.2 mils, about the same as the control mat, but the B* value was much better, 24.9. This mat of the present invention hid the yellow color of the yellow insulation board much better than the conventional control mat.

EXAMPLE 3

Another mat was made in the same manner as used in Example 1 except the mat was made heavier with more fiber and the same binder to produce a second control mat having a basis wt. of 2.04 lbs./100 sq. ft. and an LOI (loss on ignition) of 26.8 percent. This mat had a permeability of 557 cu. ft./sq. ft./min., a thickness of 37.4 mils and a B* value of 19.9. This second control mat had a better hiding capability than the mats of Examples 1 and 2, but at a costly weight penalty due to using more fiber and binder.

EXAMPLE 4

Another mat was made in the same manner as used in Example 1 except that the weight of the mat was reduced and an addition of 10 wt. percent, based on the dry weight of the binder, of 1.0 micron diameter, hard-hollow microspheres latex was made to the binder. These microspheres are available from Rohm & Haas Company as HP 1005 product.

The basis wt. of this mat was 1.57 lbs./100 sq. ft., much lower than the second control mat. The porosity of this Example 4 mat was 635 cu. ft./sq. ft./min., the thickness was a thinner 30.6 mils, the LOI was slightly lower at 26.3 percent and the B* value was lower at 19.7. This mat of the present invention had a slightly better hiding power at a substantially lower basis wt. and thickness.

EXAMPLE 5

Another mat was made in the same manner as used in Example 1 except that one half inch long 13 micron fiber was used instead of the 10 micron fiber and the binder was controlled to produce a mat having an LOI of about 21 percent.

This mat, a third control mat, had a basis wt. of 1.46 lbs./100 sq. ft., a permeability of 798 cu. ft./sq. ft./min., a thickness of 31 mils and a B* value of 26.5. This mat had slightly better hiding power than the first control mat, but worse than the mats of Examples 2 and 4.

EXAMPLE 6

A mat was made using the procedure of Example 5 except that a 10 wt. percent, based on the dry wt. of the binder, addition of NovaCote PC™ 3050 available from Georgia Pacific of Atlanta, Ga., and a 5 wt. percent addition of titania pigment called Super Seatone® Titanium White, based on the dry wt. of the binder, were made to the conventional binder. The NovaCote PC™ 3050 is an aqueous clay/binder having a solids content of 64-68 percent, a Brookfield viscosity in the range of 100-1000 centipoise and a density of 13 lbs./gallon. This product is currently used to coat paperboard products to improve printing properties. The Super Seatone® Titanium White is a titamium oxide pigment available from BF Goodrich of Cincinnati, Ohio. This product has a density o9f 16.2 lbs./gallon and a solids content of 64 wt. percent in water 26.6 wt. percent water and 4.5 wt. percent propylene glycol.

The basis wt. of this mat of the present invention was 1.41 lbs./100 sq. ft., the permeability was 801 cu. ft./sq. ft./min., a thickness of 30 mils and a B* value of 19.7. This mat had much better hiding value than the conventional mat of Example 5 at slightly lower basis weight.

EXAMPLE 7

A mat was made using the same procedure and formulation as in Example 6, but the formation of the mat was controlled to produce a dry mat having a basis weight of 1.55 lbs./100 sq. ft. and a binder content of 24.3 wt. percent. This mat had a thickness of 24 mils, a permeability of 800 cu. ft./minute/sq. ft. and a B* value of 21.7.

These examples show the surprising fact that mats having 20-30 percent lower basis weight can have the same or superior hiding power if the resin binder holding the fibers together contains a sufficient amount of a paper coating material, preferably about 5-10 wt. percent, based on the dry weight of the binder, when the paper coating material is applied as an ingredient of the resin binder.

Having the benefit of the above disclosure, many other modifications will be obvious to the skilled artisan, all of which are intended to be included in the scope of the following claims.

I claim:

1. An uncoated nonwoven fibrous mat having excellent hiding power comprising chopped glass fibers having an average diameter in the range of about 10 to about 17 microns and a length in the range of about 0.25-3 inches, bound together throughout the entire mat with a binder derived from an aqueous, resin binder system, the improvement comprising that the mat has a B* value, as a measure of (L*a*b*) provided by the Hunter Colorimeter, of 24.9 or less, a mat density of no greater than about 1.55 lbs. per 100 sq. ft. per 24 mils of mat thickness, the loss on ignition of the mat being no greater than about 26.3 wt. percent of the mat and the binder containing about 5-20 wt. percent, based on the dry weight of the resin in the binder in the mat, of a paper coating material having a diameter of about 1 micron or less and selected from a group consisting of a clay, powdered limestone, conventional white pigments, hard polymer microspheres, glass microspheres and ceramic microspheres in the binder bonding the glass fibers together throughout the entire mat, the nonwoven fibrous mat having an air permeability of at least about 635 cubic feet per minute per square foot of mat.

2. An uncoated nonwoven fibrous mat having excellent hiding power with a B* value, as a measure of (L*a*b*) provided by the Hunter Colorimeter, of 24.9 or less, a mat density of no greater than about 1.55 lbs. per 100 square feet per 24 mils of mat thickness and comprising chopped glass or polymer fibers having a length in the range of about 0.25-1.25 inches, the fibers having an average diameter in the range of about 10-13 microns, bonded together throughout the entire mat with a binder derived from an aqueous binder system containing a conventional resin binder selected from the group consisting of modified urea formaldehyde, melamine formaldehyde, furan, polyvinyl alcohol, hydroxyl ethyl cellulose, carboxyl methyl cellulose, cellulose gums, polyvinyl pyrilidone, polyvinyl acetate homopolymer, and about 5-15 wt. percent, based on the dry weight of the resin in the binder in the mat, of a paper coating material having a particle size of about 1 micron or less selected from a group consisting of clay, powdered limestone, titania conventional white pigments, hard polymer microspheres, glass microspheres, and ceramic microspheres in the binder bonding the fibers together throughout the entire mat, the nonwoven fibrous mat having a loss on ignition of about 24.3 to about 26.3 wt. percent of the mat, a maximum thickness of about 30.6 mils and an air permeability of at least about 635 cubic feet per minute per square foot of mat.

3. The mat of claim 2 wherein the mat contains 5-10 wt. percent, based on the dry weight of binder in the mat, of hard polymer microspheres.

4. The mat of claim 2 wherein the mat contains 5-15 wt. percent, based on the weight of the resin binder in the mat, of clay, titania, or a mixture thereof and has an air permeability of at least about 696 cubic feet per minute per square foot of mat.

5. A laminate comprising a layer of glass fiber insulation having bonded to at least one surface an uncoated nonwoven glass fiber mat having excellent hiding power, the mat comprising chopped glass fibers having a length in the range of about 0.25-1.25 inches bound together with a resin binder system, the fibers having an average diameter in the range of about 10-17 microns, the improvement comprising that the mat has a B* value, as a measure of (L*a*b*) provided by the Hunter Colorimeter, of 24.9 or less, a loss on ignition in the range of about 24.3 to about 26.3 wt. percent of the mat, a mat density of no greater than about 1.55 lbs. per 100 square feet per 24 mils, a thickness of no greater than about 30.6 mils and contains about 5-20 wt. percent, based on the weight of the resin in the dry binder system in the mat, of a paper coating material having a diameter of about 1 micron or less and selected from a group consisting of a clay, titania, conventional white pigments hard polymer microspheres, glass microspheres and ceramic microspheres in the binder system bonding the fibers together throughout the entire nonwoven glass fiber mat, The nonwoven fibrous mat having an air permeability of at least about 635 cubic feet per minute per square foot of mat.

6. The laminate of claim 5 wherein the mat contains about 5-10 wt. percent, based on the dry weight of binder in the mat, of hard polymer microspheres.

7. The laminate of claim 5 wherein the mat contains about 5-15 wt. percent, based on the dry weight of the resin binder in the mat, of clay, titania, or a mixture thereof, the nonwoven fibrous mat having an air permeability of at least about 696 cubic feet per minute per square foot of mat.

* * * * *